US012641385B2

(12) United States Patent
Hillbratt

(10) Patent No.: US 12,641,385 B2
(45) Date of Patent: May 26, 2026

(54) SYSTEMS AND METHODS FOR ADJUSTMENT OF AUDITORY PROSTHESES BASED ON TACTILE RESPONSE

(71) Applicant: Cochlear Limited, Macquarie University (AU)

(72) Inventor: Martin Evert Gustaf Hillbratt, Molnlycke (SE)

(73) Assignee: Cochlear Limited, Macquarie University (AU)

( * ) Notice: Subject to any disclaimer, the term of this patent is extended or adjusted under 35 U.S.C. 154(b) by 460 days.

(21) Appl. No.: 17/514,641

(22) Filed: Oct. 29, 2021

(65) Prior Publication Data

US 2022/0053278 A1 Feb. 17, 2022

Related U.S. Application Data

(63) Continuation of application No. 15/158,333, filed on May 18, 2016, now abandoned.

(60) Provisional application No. 62/387,425, filed on Dec. 24, 2015.

(51) Int. Cl.
*H04R 25/00* (2006.01)

(52) U.S. Cl.
CPC ............ *H04R 25/70* (2013.01); *H04R 25/30* (2013.01); *H04R 25/606* (2013.01); *H04R 2460/13* (2013.01)

(58) Field of Classification Search
CPC ................................ H04R 25/70; H04R 25/30
See application file for complete search history.

(56) References Cited

U.S. PATENT DOCUMENTS

| | | | | |
|---|---|---|---|---|
| 7,397,926 | B1 * | 7/2008 | Frerking | H04R 25/554 381/315 |
| 8,612,011 | B2 | 12/2013 | Seligman | |
| 8,634,872 | B2 | 1/2014 | Hong et al. | |
| 2008/0267435 | A1 * | 10/2008 | Schumaier | H04R 25/70 381/314 |
| 2009/0240307 | A1 | 9/2009 | Seligman | |
| 2010/0269040 | A1 | 10/2010 | Lee | |
| 2011/0038498 | A1 * | 2/2011 | Edgar | G06F 3/016 715/702 |
| 2011/0044483 | A1 | 2/2011 | Edgar | |
| 2011/0200213 | A1 | 8/2011 | Knox | |

(Continued)

FOREIGN PATENT DOCUMENTS

| | | |
|---|---|---|
| CN | 104111791 | 10/2014 |
| CN | 104169840 | 11/2014 |

OTHER PUBLICATIONS

Office Action in Chinese Application No. 201680075311.1 mailed Jul. 24, 2019, 8 pages.

(Continued)

*Primary Examiner* — Ping Lee
(74) *Attorney, Agent, or Firm* — Edell, Shapiro & Finnan, LLC

(57) ABSTRACT

Embodiments disclosed herein relate to systems and methods for performing fitting of an auditory prosthesis using tactile responses. A tactile feedback device determines a physical manipulation in response to a test stimulus. A type of adjustment can be determined based upon the type of the physical manipulation and the type of the test signal. A scaling of the adjustment can be determined based on the degree of the physical manipulation.

20 Claims, 7 Drawing Sheets

(56) References Cited

U.S. PATENT DOCUMENTS

| | | | | |
|---|---|---|---|---|
| 2012/0120000 | A1 | 5/2012 | Lucic et al. | |
| 2013/0023954 | A1 | 1/2013 | Meskens | |
| 2013/0191791 | A1 | 7/2013 | Rydenhag et al. | |
| 2013/0344859 | A1 | 12/2013 | Abramson et al. | |
| 2014/0023214 | A1 | 1/2014 | Edgar | |
| 2015/0010177 | A1 | 1/2015 | Kwon et al. | |
| 2015/0026623 | A1 | 1/2015 | Horne | |
| 2015/0043748 | A1 | 2/2015 | Sudo | |
| 2015/0256942 | A1* | 9/2015 | Kinsbergen ............ | H04R 25/30<br>381/313 |

OTHER PUBLICATIONS

International Search Report and Written Opinion for PCT/1B2016/001919, mailed May 11, 2017, 14 pages.

* cited by examiner

400

SYSTEMS AND METHODS FOR ADJUSTMENT OF AUDITORY PROSTHESES BASED ON TACTILE RESPONSE

BACKGROUND

Hearing loss, which may be due to many different causes, is generally of two types: conductive and sensorineural. Sensorineural hearing loss is due to the absence or destruction of the hair cells in the cochlea that transduce sound signals into nerve impulses. Various hearing prostheses are commercially available to provide individuals suffering from sensorineural hearing loss with the ability to perceive sound. For example, cochlear implants use an electrode array implanted in the cochlea of a recipient (i.e., the inner ear of the recipient) to bypass the mechanisms of the middle and outer ear. More specifically, an electrical stimulus is provided via the electrode array to the auditory nerve, thereby causing a hearing percept.

Conductive hearing loss occurs when the normal mechanical pathways that provide sound to hair cells in the cochlea are impeded, for example, by damage to the ossicular chain or the ear canal. Individuals suffering from conductive hearing loss may retain some form of residual hearing because some or all of the hair cells in the cochlea functional normally.

Individuals suffering from conductive hearing loss often receive a conventional hearing aid. Such hearing aids rely on principles of air conduction to transmit acoustic signals to the cochlea. In particular, a hearing aid typically uses an arrangement positioned in the recipient's ear canal or on the outer ear to amplify a sound received by the outer ear of the recipient. This amplified sound reaches the cochlea causing motion of the perilymph and stimulation of the auditory nerve.

In contrast to conventional hearing aids, which rely primarily on the principles of air conduction, certain types of hearing prostheses commonly referred to as bone conduction devices, convert a received sound into vibrations. The vibrations are transferred through the skull to the cochlea causing motion of the perilymph and stimulation of the auditory nerve, which results in the perception of the received sound. Bone conduction devices are suitable to treat a variety of types of hearing loss and may be suitable for individuals who cannot derive sufficient benefit from conventional hearing aids.

SUMMARY

Embodiments disclosed herein relate to systems and methods for performing fitting of an auditory prosthesis using tactile responses. A tactile feedback device determines a physical manipulation in response to a test stimulus. A type of adjustment can be determined based upon the type of the physical manipulation and the type of the test signal. A scaling of the adjustment can be determined based on the degree of the physical manipulation. Alternate embodiments relate to adjusting the settings of a auditory prosthesis using a tactile feedback device. The adjustments can be made while the tactile feedback device is in a locked state.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

DETAILED DESCRIPTION

Embodiments disclosed herein relate to systems and methods for performing fitting of an auditory prosthesis using tactile responses. Fitting is the process of tuning or adjusting an auditory prosthesis based upon the particular needs of a recipient. For simplicity of illustration, embodiments of the present disclosure will be described with respect to fitting a hearing prosthesis such as, but not limited to, a cochlear implant, a hearing aid, a direct acoustic simulator, an active or passive transcutaneous bone conduction device, an auditory brainstem implant, middle ear devices that directly stimulate a middle ear structure such as the ossicular chain, tooth anchored hearing devices, etc. However, one of skill in the art will appreciate that the embodiments disclosed herein can be practiced with other types of medical prostheses, such as prosthetic limbs, artificial organs, etc.

Fitting is generally performed using fitting software executing on a device, such as a computer or laptop. During the fitting process, different test signals are played for a recipient. The recipient indicates whether they can hear the test signal, whether it is too loud, etc. However, the indications provide by the recipient are generally binary in nature. The fitting process can be improved if an adjustment can be scaled; however, it is difficult to determine a scaling factor based upon binary answers. Tactile feedback provides the ability to determine a scaling factor for an adjustment.

Figure 1:
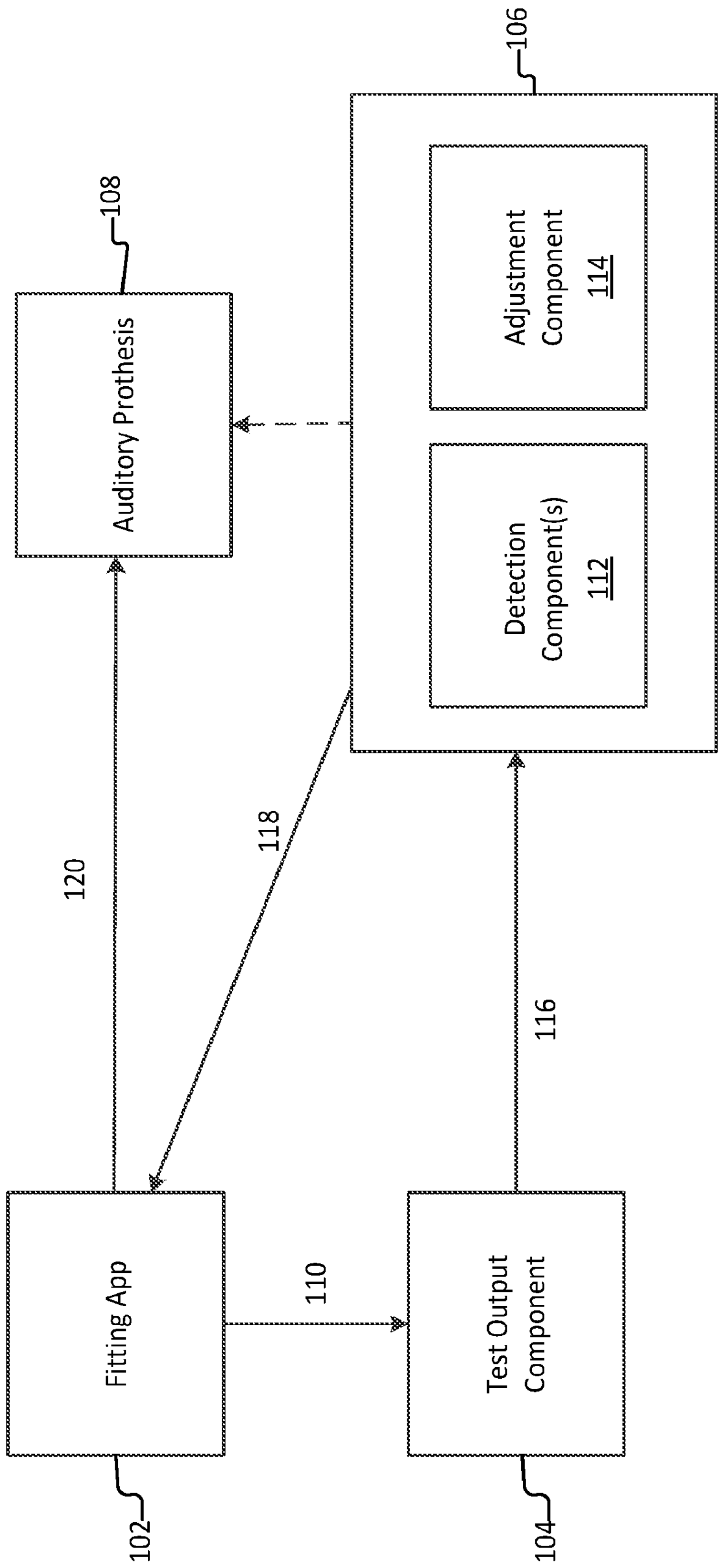
FIG. 1 is an exemplary system for adjusting an auditory prosthesis based upon tactile responses.

FIG. 1 is an exemplary system 100 for adjusting an auditory prosthesis based upon tactile responses. The system 100 includes four exemplary components, a fitting device 102, a test output component 104, a tactile feedback device 106, and an auditory prosthesis 108. In embodiments, the fitting device 102 can be a device capable of executing a fitting application, such as, for example, a computer, a laptop, a tablet, a smartphone, etc. In examples, the fitting device 102 includes an interface that allows for interaction with a clinician and/or a recipient. The interface can be a touch screen, a mouse, a keyboard, a microphone, etc. The fitting device 102 can also include input output components such as a WiFi adaptor, Bluetooth adapter, Ethernet connection, or any other type of communication connection capable of transmitting data to and/or receiving data from the various components illustrated in FIG. 1. In examples, the fitting device 102 generates one or more test signals that are used to fit the device for a recipient. The one or more test signals can be provided to the test output component 104, as illustrated by arrow 110. In examples, the test signals can be audible tones generated using the test output component 104. In such examples, the test output component 104 can be a speaker. Alternatively, the test signals generated can be delivered directly to the auditory prosthesis 108 via a communications connection, for example, over a network or other communication medium. In such examples, the test output component 104 can be a network communications connection (e.g., a WiFi adapter, Ethernet connection, etc.) or other type of communication component (e.g., a Bluetooth adaptor, an IR adapter, etc.). Although the fitting device 102 and the test output component 104 are illustrated a two separate components in FIG. 1, in alternate examples the fitting device 102 and the test output component 104 can reside on a single device.

The one or more test signals are generated or provided to the auditory prosthesis 108. The auditory prosthesis 108 processes the test signals and generates sound for the recipient. In examples, the auditory prosthesis can be a cochlear implant, a hearing aid, a direct acoustic simulator, an active or passive transcutaneous bone conduction device, an auditory brainstem implant, middle ear devices that directly stimulate a middle ear structure such as the ossicular chain, tooth anchored hearing devices, etc. During a traditional fitting session, the recipient responds to the sound generated by auditory prosthesis 108 in response to a test signal. For example, a test signal can be generated and an audiologist (or fitting software if the recipient is performing a self-fitting) can query the recipient as to whether or not they heard the sound, whether the sound was too loud, etc. These queries are generally binary, that is, the recipient only responds with a yes or no answer. As such, traditional fittings do not capture the degree that the auditory prosthesis 108 should be adjusted. For example, if the query is whether the sound is too loud and the recipient responds with affirmatively, the fitting component 102 can adjust the volume of the auditory prosthesis 108. However, because there is no indication as to the level of loudness, the adjustment may not be sufficient. This results in performing multiple tests to ultimately determine the correct adjustment, which increases the time in which it takes to perform the fitting and also results in additional discomfort for the recipient. However, the fitting process can be improved by capturing the degree or scale of the auditory prosthesis' performance in response to a test signal. The degree or scale can be determined based on tactile response.

System 100 includes a tactile feedback device 106. The tactile feedback device 106 captures the recipient's tactile response to a test signal. The degree of the tactile response can be correlated to the degree of adjustment that is required for the auditory prosthesis 108. As such, feedback generated by the tactile feedback device 106 can be used to determine a correct adjustment for the auditory prosthesis 108 in a manner that avoids the repeated tests generated during a traditional fitting. In examples, the tactile feedback device 106 includes one or more detection components 112 capable of detecting physical manipulation (e.g., physical displacement and/or tactile responses) of the tactile feedback device 106. In examples, the one or more detection components 112 are capable of determining physical displacement, that is, movement through space, of the tactile feedback device and/or other tactile responses, such as, for example, pressing on the device. Exemplary detection components include, but are not limited to, an accelerometer, a gyroscope, a magnetometer, a pressure sensor, a camera, and/or a microphone. Examples of tactile feedback devices include, but are not limited to, smartphones, tablets, smartwatches, dedicated remote controls, etc.

In examples, the tactile feedback device 106 is capable of identifying when a test signal has been generated. For example, if the test signal is an audible tone, the tactile feedback device 106 can identify the audible tone using a microphone. Alternatively, if the test signal is a data signal (e.g., transmitted via WiFi, Bluetooth, etc.), the tactile feedback device 106 can also receive the test signal, or an indication of the test signal, from test output component 104 (illustrated by arrow 116). In examples, the identification of the test signal prompts the tactile feedback device 106 to track tactile responses. Doing so avoids detection of unrelated movements, which can lead to the determination of incorrect adjustments. In examples, tactile feedback device 106 also includes an adjustment component 114. The adjustment component receives data about the physical manipulation from the one or more detection components 106 and determines an adjustment for the auditory prosthesis based on the physical manipulation. In examples, the adjustment determined by the adjustment component 114 can be provided to the fitting device 102 (illustrated by arrow 118) which, in turn, will send an instruction to the auditory prosthesis 108 to apply the adjustment. Alternatively, or in addition to, the adjustment component 114 can provide instructions to perform an adjustment directly to the auditory prosthesis 108 (illustrated by arrow 120).

In alternate embodiments, tactile feedback device 106 does not include an adjustment component 114. In such embodiments, the data representing the physical manipulation detected using the one or more detection components 112 can be provided directly to the fitting device 102. In such embodiments, the fitting device 102 can determine an adjustment based on the received physical manipulation data. The fitting device 102 can then instruct the auditory prosthesis 108 to apply the adjustment.

Figure 2:
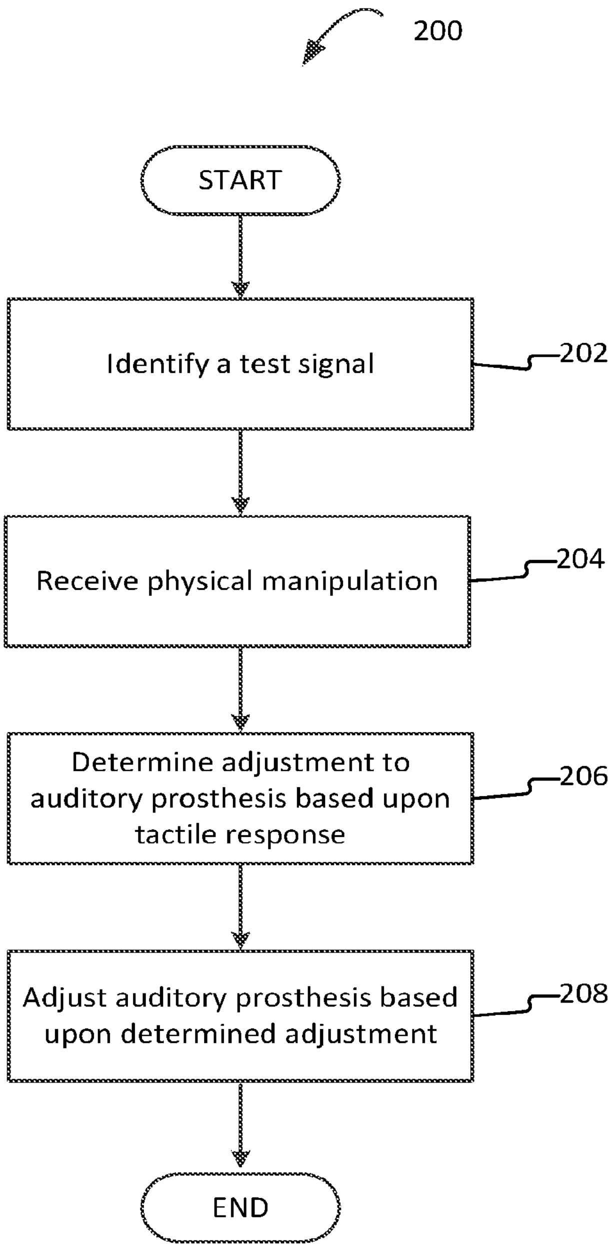
FIG. 2 is an exemplary method for determining an adjustment for an auditory prosthesis based upon tactile feedback.

FIG. 2 is an exemplary method 200 for determining an adjustment for an auditory prosthesis based upon tactile feedback. The method 200 can be implemented using hardware, software, or a combination of hardware and software. In embodiments, the method 200 can be performed by a tactile feedback device, for example, tactile feedback device 106. For example, the operations described with respect to FIG. 2 can be performed by the adjustment component 114 and/or the detection components 112. Flow begins at operation 202 where a test signal is identified. As described above, identification of a test signal can act as a trigger to start monitoring physical manipulation of a device. Without the trigger, physical manipulation unrelated to the test signal can be captured. Ultimately, the unrelated physical manipulation data can lead to an incorrect determination of an adjustment for the prosthesis. In one embodiment, the test signal is an audible tone. In such embodiments, detection of the test signal can comprise detecting the audible tone using a microphone. In alternate embodiments, detecting the test signal can include receiving an indication of the test signal or the test signal itself via a communications connection. In such embodiments, the signal can be received from the device generating the test signal. The indication of the test signal and/or the test signal itself can be received at the same time that the test signal is provided to an auditory prosthesis. In still further embodiments, the test signal can be detected via input received from the user via an interface. In such examples, the interface can be an activatable button. Alternatively, the input indicating the test signal can be a predetermined physical manipulation. For example, placement of the device performing the method 200 in a predetermined manner can indicate that a test signal is about to be received by the auditory prosthesis.

Upon detection of the test signal, flow continues to operation 204 where a physical manipulation is detected. Exemplary types of physical manipulations a physical displacement, such as, for example, a rotation, a tilt, a shake, or another tactile response, such as a button press or a squeeze. In addition to detecting a type of physical manipulation, in embodiments, the degree of physical manipulation is also determined. For example operation 204 can include determining the degree of a tilt or rotation, the distance the object performing the method 200 travelled, the pressure applied by a push or a squeeze, etc. One of skill in the art will appreciate that the determination of the degree of manipulation varies depending on the type of physical manipulation.

Flow continues to operation 206 where an adjustment is determined based upon the physical manipulation. In examples, a type of adjustment can be determined based on the type of physical manipulation. For example, a tilt can indicate a volume adjustment. Continuing with the example, tilting the device forward can indicate an increase in volume while tilting the device backwards can indicate a decrease. In addition to determining a type of adjustment, a scale for the adjustment can also be determined at operation 206. In embodiments, the scale of the adjustment can be based on the degree of physical manipulation. Continuing with the previous example, a slight tilt forward can indicate that the volume should be increased by 4 decibels, a moderate tilt can indicate that the volume should be increased by 10 decibels, and a strong tilt can indicate that the volume should be increased by 15 decibels. Examples of determining a type and a scale of an adjustment will be discussed in further detail below.

After determining the adjustment, flow continues to operation 208 where the adjustment determined at operation 206 is applied to the auditory prosthesis. In one embodiment, applying the adjustment to the auditory prosthesis includes sending an instruction to the auditory prosthesis to apply the determined adjustment to the auditory prosthesis. The instructions can be sent via a wireless or wired connection. In an alternate embodiment, the adjustment can be sent to a remote device. For example, the determined adjustment can be sent to a fitting device, such as fitting device 102. Fitting device 102 can then apply the adjustment to the auditory prosthesis.

Figure 3:
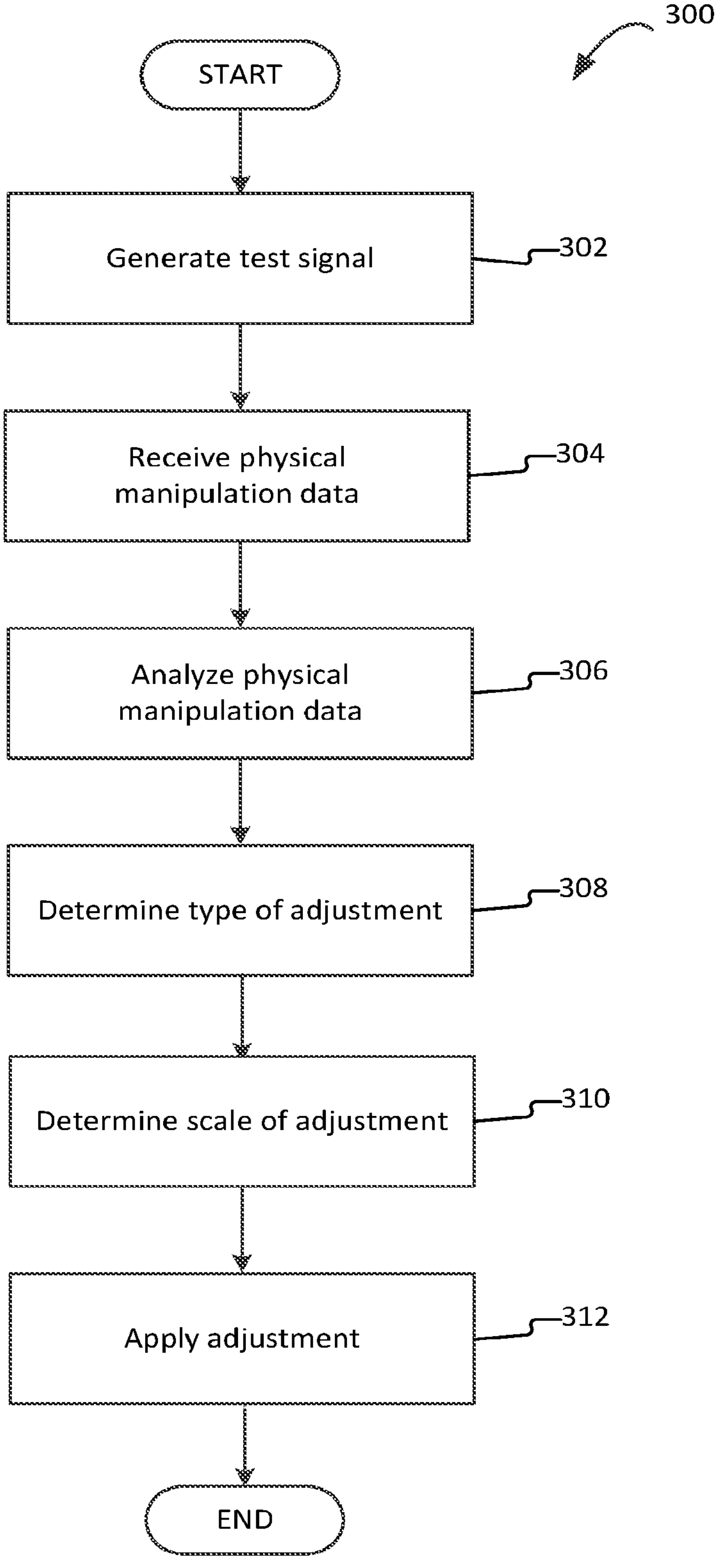
FIG. 3 is an alternate exemplary method for determining an adjustment for an auditory prosthesis based upon tactile feedback.

FIG. 3 is an alternate exemplary method 300 for determining an adjustment for an auditory prosthesis based upon tactile feedback. The method 300 can be implemented using hardware, software, or a combination of hardware and software. In embodiments, the method 300 can be performed by a fitting device, for example, fitting device 102 of FIG. 1. Flow begins at operation 302 where a test signal is generated. In embodiments, the test signal is selected based upon the type of setting that is being tested for an auditory prosthesis. The test signal can be generated in response to input received via a user interface. For example, a selection of a test signal can be received from a clinician or a recipient interacting with the device performing the method 300. In one embodiment, generating the test signal can include playing an audible tone. If the device performing the method 300 has a suitable output device, e.g., a speaker, the device performing the method 200 can generate the audible tone. Alternatively, generating the audible tone can be performed by sending an instruction to a remote device capable of generating the audible tone. In further embodiments, generating the test signal can be performed by sending an instruction, via a wired or wireless connection, to an auditory prosthesis to generate a test signal.

Flow continues to operation 304 where, in response to generating the test signal, data representing a physical manipulation is received. The data representing the physical manipulation can be received from a remote device, such as the tactile feedback device 105 of FIG. 1. In one embodiment, the data received at operation 304 can be raw data representing the physical manipulation of the device. For example, the raw data can be data generated by one or more detection components without any additional processing. Alternatively, the data received can be an indicator of a type of physical manipulation.

Flow continues to operation 306 where the physical manipulation data is analyzed. If the physical manipulation data received at operation 306 is raw data, analyzing the physical manipulation data includes determining a type of physical manipulation based on the raw data. Exemplary types of physical manipulations a physical displacement, such as, for example, a rotation, a tilt, a shake, or another tactile response, such as a button press or a squeeze. In addition to detecting a type of physical manipulation, in embodiments, the degree of physical manipulation is also determined. For example operation 306 can include determining the degree of a tilt or rotation, the pressure applied by a push or a squeeze, etc. In alternate embodiments, if the physical manipulation data received at operation 304 is processed data, that is, if it is an indication of the type of physical manipulation performed rather than data generated by a detection component, then operation 306 can be skipped.

Flow continues to operation 308 where a type of adjustment is determined based upon the physical manipulation. As previously discussed, a type of adjustment can be determined based on the type of physical manipulation. For example, a tilt can indicate a volume adjustment. Continuing with the example, tilting the device forward can indicate an increase in volume while tilting the device backwards can indicate a decrease. After determining a type of adjustment, flow continues to operation 310 where the scale of the adjustment is determined. In embodiments, the scale of the adjustment can be based on the degree of physical manipulation. Examples of determining a type and a scale of an adjustment will be discussed in further detail below. Although determining the type of adjustment and the scale for the adjustment is displayed as two discrete operations in FIG. 3, one of skill in the art will appreciate that the operations 308 and 310 can be performed at the same time.

After determining the adjustment, flow continues to operation 312 where the adjustments determined at operations 308 and 310 are applied to the auditory prosthesis. In one embodiment, applying the adjustment to the auditory prosthesis includes sending and instruction to the auditory prosthesis to apply the determined adjustments to the auditory prosthesis. The instructions can be sent via a wireless or wired connection.

Having described various embodiments for adjusting an auditory prosthesis based on physical manipulations, the disclosure will now provide examples of how different adjustments can be determined. In one embodiment, data produced by an accelerometer can be used to determine that the physical manipulation is a shake. In embodiments, a shake can indicate that the test signal is too strong. The force of the shake can indicate how strong the sound is such that a more forceful shake results in a greater change in volume. Alternatively, a tilt can be used to determine a volume adjustment. Receiving a forward tilt can indicate that the test signal is too strong (e.g., too loud or contains too much of a particular characteristic such as treble or base) while a backwards tilt can indicate that the test signal is weak. The degree of the tilt can be used to determine a scale for the adjustment such that the higher the degree of the tilt the greater the adjustment.

In other examples, receiving a press (e.g., a tactile response) can be used to determine an adjustment. In such examples, data used to determine the press can be generated using a pressure pad. In one example, receiving a press can indicate that a sound is too weak. If a hard press is received, that can indicate that the volume should be significantly adjusted (e.g., 15 decibels). If the press is weak, that can indicate that the volume should be slightly adjusted (e.g., 4 decibels). Timing can also be taken into account. For example, a long press indicates that the test signal was not understood by the recipient. As such, an instruction to replay the test signal can be determined based upon the tactile feedback. In further examples, a press can be used to change an attribute of a feature, timing of a compressor, level of static noise or wind reduction, feedback suppression, etc. The degree of the change can vary depending on whether the press was a short press or a long press.

In further examples, adjustments can be determined based upon tilting of a device. In one example, tilting forward or backward can indicate a positive change or a negative change in volume. The scale of the change is based upon the degree of tilt such that a higher degree of tilt results in a larger volume change. Alternatively, a tilt can indicate a change in aggressiveness of an algorithm (e.g., noise reduction, wind reduction) or a feature. In other examples, a tilt can indicate a change to a selected input, for example, between streaming audio from an external device and using a microphone input. In further examples, a tilt left or right can indication an adjustment to a frequency shaping or to alternate to other parameters related to the sound output. Again, the level of change can be based on the degree of tilt.

The following is an example use case for determining an adjustment based upon tilt of a tactile feedback device. The tactile feedback device can remain still when there is no test signal (or when the recipient does not hear a test signal). Once the test signal can be heard, the tactile feedback device can determine that it has been tilted backwards or forwards. If the tactile feedback device is tilted backwards, the test signal may be strong, if it is tilted forwards, the test signal may be weak. In one example a scale of a −15-0 dB when tilting backwards and 0-−5 dB—when tilting forward can be present. This means that if the tactile feedback device determines that it is tilted backwards the loudness is decreased by 15 dB. If the tilt is slightly less than a lower reduction in test level is made, for example only 4 dB. If it is determined that there is a slight tilt forward the sound can still be heard but it could be weaker and still audible hence a reduction is made. If the device is further tilted forward the sound is very weak and almost not audible hence the threshold is found. In one example the system learn the behavior of a recipient, thereby customizing the adjustments based upon the recipients past usage.

In further embodiments, a camera can be used to determine the movement of device through space. For example, a camera can be used to determine how far the feedback device is from an object. In said example, a starting position can be determined. The scale of the adjustment can be determined based on how far the feedback device moves relative to the object. For example, moving the device forward can indicate an increase in volume while movement away can indicate a decrease. Other settings can be adjusted similarly.

Embodiments disclosed herein can also determine adjustments based on rotation or shaking of the feedback device. For example, rotating the device right can be used to determine an increase in a feature. Rotation left can indicate a decrease. The speed of a shake can be used to determine a scale of adjustment as well. While the different types of physical manipulations have been described with respect to determining adjustments, one of skill in the art will appreciate that the different physical manipulations can be combined to determine adjustments. For example, a button can be pressed while the feedback device is rotated. Additionally, while examples provided herein described particular adjustments with respect to particular physical manipulations, one of skill in the art will appreciate that the physical manipulations can be used to determine other types of adjustments without departing from the scope of this disclosure. Furthermore, the same type of physical manipulation can result in different types of adjustments based upon context or the type of test signal.

Figure 4:
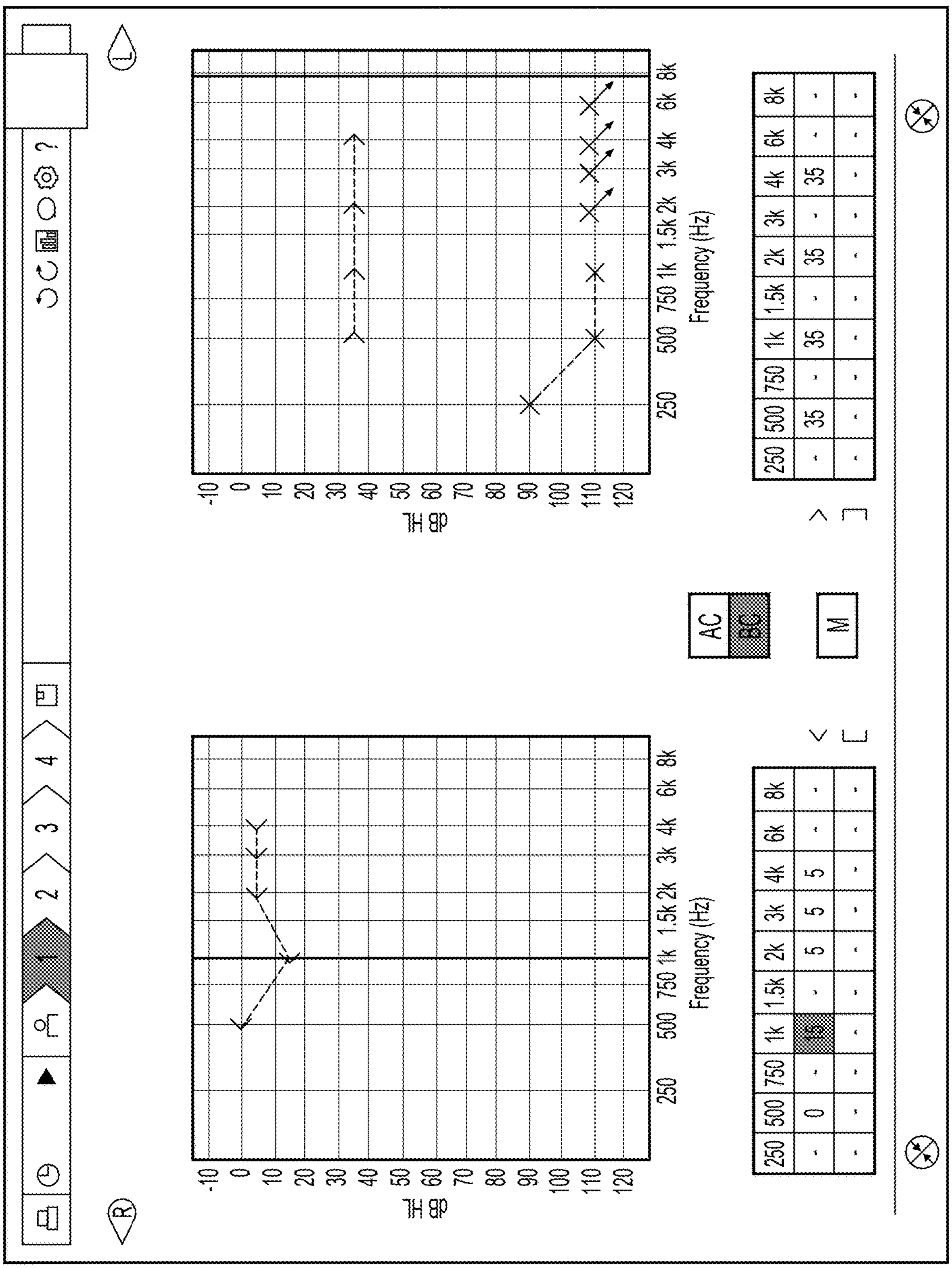
FIG. 4 is an exemplary user interface that can be displayed by a fitting algorithm during an audiogram or a hearing test.

FIG. 4 is an exemplary user interface 400 that can be displayed by a fitting algorithm during an audiogram or a hearing test. Physical manipulations determined by the tactile feedback device can also be used to interact with the user interface 400. For example, the frequency can be adjusted by determining that the tactile feedback device was tilted right or left. Determination of a weak press can be used to select a test tone location. Determination of a hard press can activate stimuli (e.g., a test signal). When the stimulus is activated, determination of a forward tilt can result in an increase in the volume of the stimuli.

In alternate embodiments, tactile feedback can be used during self-fitting, that is a fitting process performed by the recipient. In examples, the selection of a test frequency can be made by tilting the tactile feedback device right or left. The strength of a test signal at a selected frequency can be adjusted based upon a determination that the tactile feedback device is tilted forward or backwards. For example, a forward tilt can increase the strength of a test signal while a backwards tilt can decrease the strength. A weak press can select a test tone location. A hard press can be used to activate the test signal. After activation, the determined physical manipulations can be used to adjust different settings. For example, tiling forward and backwards can be used to increase or decrease intensity or loudness.

In one example the test signal is active the whole time. Starting off at, as an example, 1 kHz with a test tone corresponding to 30 dB hearing loss. Determining a backwards tilt decreases the sound at this frequency and forward tilt makes it stronger. In an exemplary use, a user tilts forwards and backwards until the test signal is just audible. Then a larger tilt towards left or right to change frequency of the test tone and continue the process of forward and backward tilting here. Once a number of frequencies have been tuned the determination of shake can indicate an exit of a measurement mode. In further embodiments, different frequency ranges can be displayed as buttons on a tactile feedback device. Selection of the specific frequency range can be used to generate test signals in the selected frequency range.

The tactile feedback device can also be used to initiate a connection with an auditory prosthesis in order to make adjustments to the auditory prosthesis. For example, if a determination is made that the tactile feedback device is moved forwards or backwards quickly, then a connection with the hearing prosthesis can be initiated. The hearing prosthesis can then be adjusted using the tactile feedback device. In further examples, the connection and control can be done while the tactile feedback device is locked. For example, if the tactile feedback device is a smartphone, the connection can be established while the home screen is locked. Then the phone can be used to adjust parameters of the hearing prosthesis while remaining in a locked state. This allows for the discreet adjustment of the hearing device, which can be preferable to a recipient in a social situation.

Figure 5:
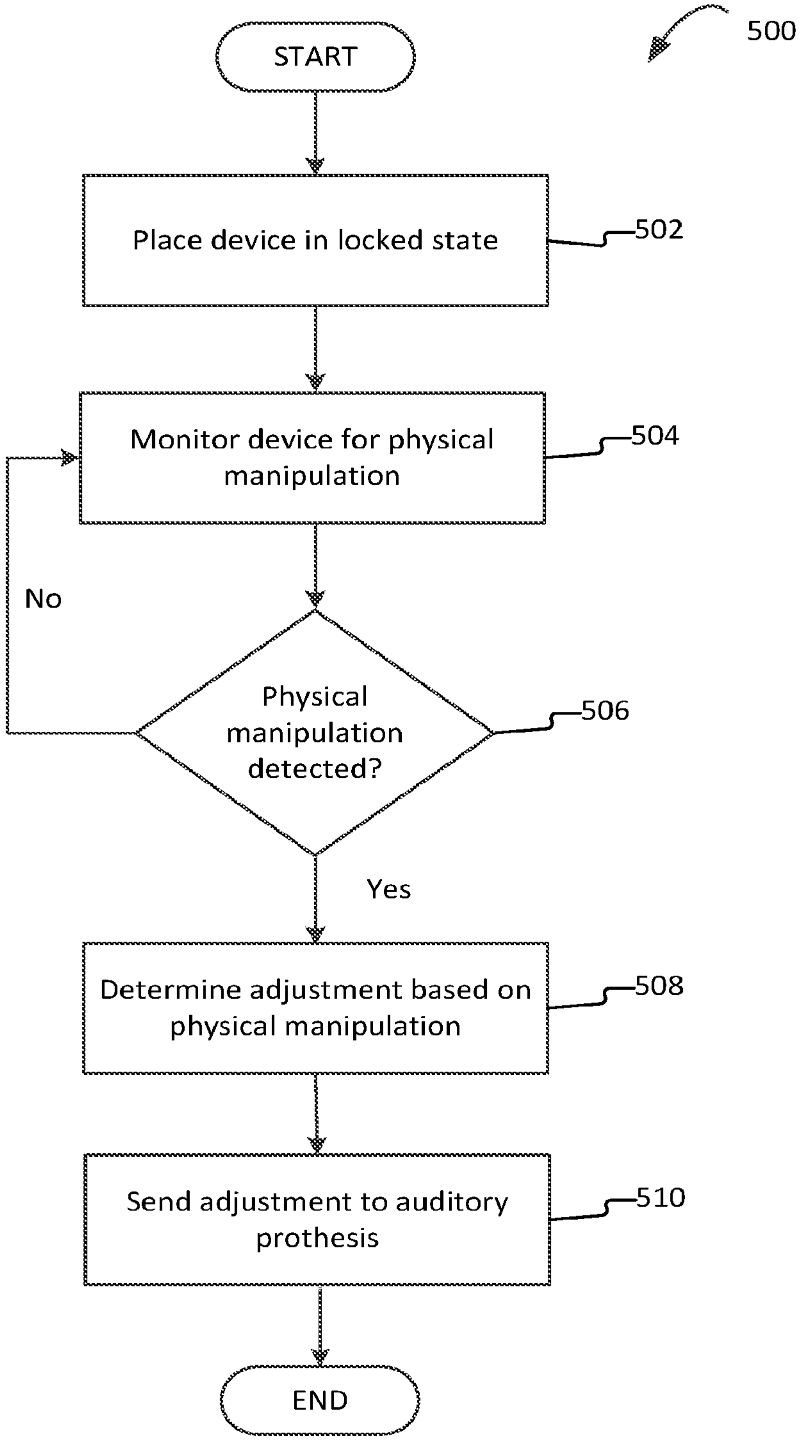
FIG. 5 is an exemplary method 500 for adjusting an auditory prosthesis using tactile responses.

FIG. 5 is an exemplary method 500 for adjusting an auditory prosthesis using tactile responses. The method 500 can be implemented using hardware, software, or a combination of hardware and software. In embodiments, the method 500 can be performed by a tactile feedback device, for example, tactile feedback device 106. Flow begins at operation 502 where the tactile feedback device is placed in a locked or incognito mode. Placing the tactile feedback device in a locked or incognito mode allows the recipient to discreetly adjust the settings of their auditory prosthesis. For example, if the tactile feedback device is a smartphone, a recipient can make adjustments by moving her phone. Because the phone is locked, others will not be able to tell that adjustments are actually being made. Flow continues to operation 404 where the tactile feedback device monitors for a physical manipulation. Monitoring for physical manipulation can be performed using detection components (e.g., an accelerometer, gyroscope, etc.). Flow continues to decision operation 506 where a determination is as to whether there has been a physical manipulation. If no physical manipulation has occurred, flow branches No and returns to operation 504 where the tactile feedback device continues to monitor for a physical manipulation. If a physical manipulation has occurred, flow branches Yes to operation 508 where an adjustment is determined based upon the physical manipulation. In examples, a type of adjustment can be determined based on the type of physical manipulation. For example, a tilt can indicate a volume adjustment. Continuing with the example, tilting the device forward can indicate an increase in volume while tilting the device backwards can indicate a decrease. In addition to determining a type of adjustment, a scale for the adjustment can also be determined at operation 206. In embodiments, the scale of the adjustment can be based on the degree of physical manipulation. Non-limiting examples of determining a type and a scale of an adjustment have been described in this disclosure.

Once the adjustment has been determined, the determined adjustment can be sent to the auditory prosthesis at operation 510. In embodiments, sending the determined adjustment can include sending instructions to the auditory prosthesis to make the determined adjustment. The instructions can be sent via wireless connection with the auditory prosthesis.

The following are exemplary use cases for adjusting an auditory prosthesis using tactile responses. In one example, temporal compression settings are adjusted by the recipient using the method 500. In a modern hearing device a Wide Dynamic Range Compression (WRDC) is often used. In most such systems timing constants are used so that when the input (or output) sound level is above a decided threshold for a time longer than the timing constant the gain is adjusted. In general terms the temporal resolution, ability to comprehend rapid changes in the sound, degrades with age. In one example the timing constants can be adjusted by a recipient within a range of allowed settings by tilting the tactile feedback device forward or backwards. Other features which can be adjusted by similar means. For example Aggressiveness of noise reduction can be adjusted using tactile feedback. Strong noise reduction will affect speech understanding/intelligibility in a negative way. Weak noise reduction increases listening effort in a negative way. Beam forming timings or resolution, i.e. how strong the attenuation of an unwanted noise source is allowed to be, can be adjusted using tactile feedback. The sound feels less natural if such attenuation is too strong. Feedback algorithm aggressiveness can be adjusted using tactile feedback. Strong settings can create artifacts on speech and musical/tonal input, weak settings can mean that feedback problems occur. Wind noise settings can also be adjusted using tactile feedback. Strong settings can mean that other sounds are affected, weak settings can mean that wind noise is more present.

In another example the recipient can adjust settings of an auditory prosthesis which best matches the current sound environment. In one example the patient can select between a limited number of pre-sets for such sound environment. Based, for example, on a hearing device classifier the sound environment is determined to be music. When the user then wants to try a different setting she can tilt the tactile feedback device left or right to select one out of, as example, three pre-stored settings which might work well in this sound environment. Alternatively, different settings can be retrieved via a network. The retrieved settings may be based upon the recipient's current sound environment. Further the user can tilt the tactile feedback device backwards or forwards to decide how much to mix these new settings with the existing map/program settings. For example, a recipient is at a music club having dinner. The auditory prosthesis detects music and reduces noise reduction and makes the frequency response more flat to give a better music experience for the user. The patient is not happy with these settings because she cannot hear her partner across the table. She therefore presses volume up/down simultaneous by moving the tactile feedback device while the tactile feedback device is locked. For example, if the tactile feedback device is a smartphone, the screen will remain black. She manages to do this without her partner or anyone else noticing. She can then tilt the tactile feedback device left to test another pre-set program for this environment, for example a program with more noise reduction and less bass amplification. She believes that this is better but not perfect because the music is then to dull. She therefore tilts her phone backwards which reduces the mix of the new settings onto the older to get settings in-between this pre-set and her earlier program. This gives a little more bass boost and a little less noise reduction. When she is happy she let go of the volume up/down buttons on the phone and the setting is saved so that the next time this sound environment is detected this new program is used.

In another example a sound scene is presented to the recipient, for example using music played by a symphonic orchestra. The sound can wirelessly be transmitted to the auditory prosthesis on the recipient. Due to the hearing loss of the user the experience of the sound balance might be incorrect. By tilting the tactile feedback device right/left forward/backwards the gain settings for bass/treble and overall gain is adjusted according to the methods described above. The recipient can then adjust the sound field balance to compensate for the hearing loss.

One aspect of modern hearing aid feasibility discussions is the amount of listening effort which is required to for example understand speech in noise. Even if the same speech scores are met the amount of listening effort can be different. By tilting the tactile feedback device more or less the amount of listening effort can be recorded. For example where a large amount of listening effort is needed a large amount of tilting is made by the user. The software can then, based on the input, adjust for example the aggressiveness of a noise reduction feature to adjust the listening effort. Often such adjustment can affect the speech understanding can also be affected in a negative way if a noise reduction feature is set too aggressive. In one example a smartphone acting as a tactile feedback device plays a word together with a level of noise. The recipient then speak the word heard, which is recorded by the smartphone or auditory prosthesis etc. In addition the recipient tilts or press to indicate the amount of effort needed to hear/understand the word.

Aspects disclosed herein can also be used to select speech coding algorithms. In one example tilting the tactile feedback device cycles through different speech coding strategies while speech is presented to the user. In examples, tilting the device towards left/right makes smaller adjustments to the coding strategy, such as stimulation rate. The recipient can then shake the device when new preferred settings have been found.

In a further example, by tilting the tactile feedback device towards a person the directionality system can focus the beam forming towards that direction. If the recipient tilts the tactile feedback device more aggressive towards that person a narrow sound field is used to pick up the sound. If the tactile feedback device is tilted more backwards a wider sound field is used, with a wider angle is used to pick up the sound. In this way the recipient can control from what direction they want the sound to be picked up and they can easily select a wider angle if more persons are involved in the conversation.

Figure 6:
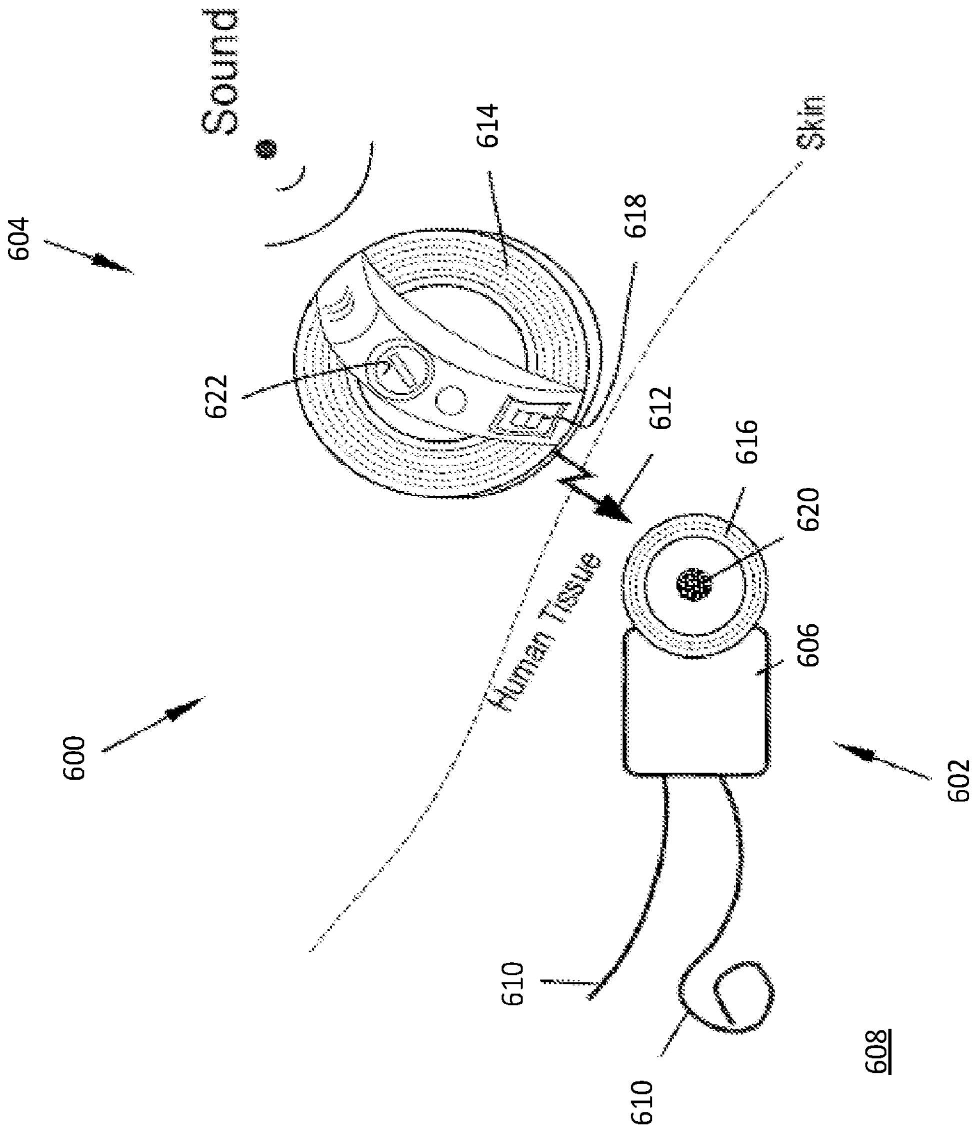
FIG. 6 is a schematic perspective view of an embodiment of an auditory prosthesis.

FIG. 6 is a schematic perspective view of an embodiment of an auditory prosthesis 600, in this case, a cochlear implant, including an implantable portion 602 and an external portion 604. The implantable portion 602 of the cochlear implant includes a stimulating assembly 606 implanted in a body (specifically, proximate and within the cochlea 608) to deliver electrical stimulation signals to the auditory nerve cells, thereby bypassing absent or defective hair cells. The electrodes 610 of the stimulating assembly 606 differentially activate auditory neurons that normally encode differential pitches of sound. This stimulating assembly 606 enables the brain to perceive a hearing sensation resembling the natural hearing sensation normally delivered to the auditory nerve.

The external portion 604 includes a speech processor that detects external sound and converts the detected sound into a coded signal 612 through a suitable speech processing strategy. The coded signal 612 is sent to the implanted stimulating assembly 606 via a transcutaneous link. In one embodiment, the signal 612 is sent from a coil 614 located on the external portion 604 to a coil 616 on the implantable portion 602. The stimulating assembly 606 processes the coded signal 612 to generate a series of stimulation sequences which are then applied directly to the auditory nerve via the electrodes 610 positioned within the cochlea 608. The external portion 604 also includes a battery and a status indicator 618, the functionality of which is described below. Permanent magnets 620, 622 are located on the implantable portion 602 and the external portion 604, respectively.

Figure 7:
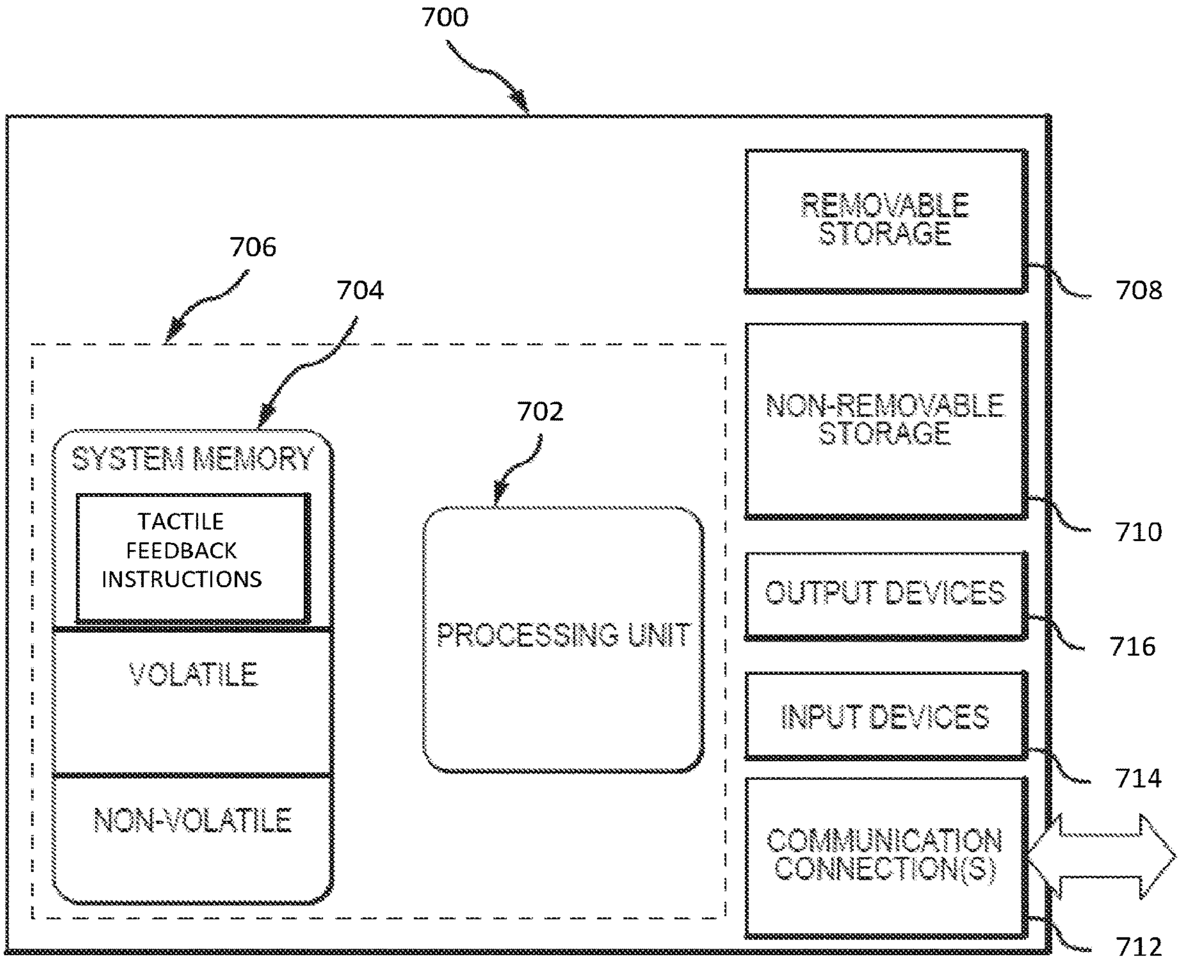
FIG. 7 illustrates one example of a suitable operating environment in which one or more of the present examples can be implemented.

FIG. 7 illustrates one example of a suitable operating environment 700 in which one or more of the present examples can be implemented. This is only one example of a suitable operating environment and is not intended to suggest any limitation as to the scope of use or functionality. Other well-known computing systems, environments, and/or configurations that can be suitable for use include, but are not limited to, auditory prostheses. In examples, an auditory prosthesis includes a processing unit and memory, such as processing unit 706 and memory 704. As such, the basic configuration 706 is part of an auditory prosthesis and/or another device working in conjunction with the auditory prosthesis.

In its most basic configuration, operating environment 700 typically includes at least one processing unit 702 and memory 704. Depending on the exact configuration and type of computing device, memory 704 (storing, among other things, instructions to implement and/or perform the alert functionality disclosed herein) can be volatile (such as RAM), non-volatile (such as ROM, flash memory, etc.), or some combination of the two. This most basic configuration is illustrated in FIG. 7 by dashed line 706. Similarly, environment 700 can also have input device(s) 714 such as a microphone, physical inputs (e.g., buttons), vibration sensors, etc. Other exemplary input device(s) include, but are not limited to, touch screens or elements, dials, switches, voice input, etc. and/or output device(s) 716 such as speakers, stimulation assemblies, etc. Also included in the environment can be one or more communication connections, 712, such as LAN, WAN, point to point, Bluetooth, RF, etc.

Operating environment 700 typically includes at least some form of computer readable media. Computer readable media can be any available media that can be accessed by processing unit 702 or other devices comprising the operating environment. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes RAM, ROM, EEPROM, flash memory or other memory technology, solid state storage, or any other tangible or non-transitory medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 700 can be a single device operating in a networked environment using logical connections to one or more remote devices. The remote device can be an auditory prosthesis, a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some examples, the components described herein comprise such modules or instructions executable by operating environment 700 that can be stored on computer storage medium and other non-transitory mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, computer system 700 is part of a network that stores data in remote storage media for use by the computer system 700.

The embodiments described herein can be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices can be employed to perform the functionality disclosed herein without departing from the scope of the disclosure.

This disclosure described some embodiments of the present technology with reference to the accompanying drawings, in which only some of the possible embodiments were shown. Other aspects can, however, be embodied in many different forms and should not be construed as limited to the embodiments set forth herein. Rather, these embodiments were provided so that this disclosure was thorough and complete and fully conveyed the scope of the possible embodiments to those skilled in the art.

Although specific embodiments were described herein, the scope of the technology is not limited to those specific embodiments. One skilled in the art will recognize other embodiments or improvements that are within the scope of the present technology. Therefore, the specific structure, acts, or media are disclosed only as illustrative embodiments. The scope of the technology is defined by the following claims and any equivalents therein.

The invention claimed is:

1. A method comprising:

identifying a test signal;

in response to identifying the test signal, detecting a physical manipulation of a mobile device, wherein the mobile device is in a locked state;

in response to detecting the physical manipulation, initiating a connection between the mobile device and an auditory prosthesis;

determining an adjustment to at least one parameter of the auditory prosthesis based at least upon a type of the physical manipulation and a degree of the physical manipulation of the mobile device; and applying the adjustment to the at least one parameter of the auditory prosthesis while the mobile device remains in the locked state.

2. The method of claim 1, wherein the mobile device is in the locked state when a home screen of the mobile device is locked.

3. The method of claim 1, wherein the mobile device comprises a smartphone, a tablet, or a smartwatch.

4. The method of claim 1, wherein the physical manipulation comprises moving the mobile device forward or moving the mobile device backward.

5. The method of claim 1, wherein determining the adjustment to at least one parameter of the auditory prosthesis comprises:

correlating a duration of the physical manipulation with a degree of adjustment to the at least one parameter.

6. The method of claim 1, wherein determining the adjustment to at least one parameter of the auditory prosthesis comprises:

determining a scale for the adjustment, wherein the scale is based upon the degree of the physical manipulation.

7. The method of claim 1, wherein initiating the connection between the mobile device and the auditory prosthesis occurs via a wireless link.

8. The method of claim 1, wherein an instruction to replay the test signal is determined upon detecting the physical manipulation.

9. The method of claim 1, wherein the adjustment to the at least one parameter of the auditory prosthesis is further determined based on a sound environment of a recipient of the auditory prosthesis.

10. The method of claim 1, wherein the test signal is an audible tone.

11. The method of claim 10, wherein the audible tone is generated during a fitting process for the auditory prosthesis.

12. The method of claim 1, wherein the physical manipulation is detected by an accelerometer or a gyroscope.

13. The method of claim 1, wherein the auditory prosthesis is a cochlear implant.

14. The method of claim 1, wherein the adjustment to the at least one parameter of the auditory prosthesis includes a volume adjustment.

15. The method of claim 1, wherein the physical manipulation comprises tilting the mobile device forward, and wherein tilting the mobile device forward indicates an increase in volume.

16. The method of claim 1, wherein the physical manipulation comprises tilting the mobile device backward, and wherein tilting the mobile device backward indicates a decrease in volume.

17. The method of claim 1, wherein the physical manipulation comprises tilting the mobile device towards left or right.

18. The method of claim 17, wherein tilting the mobile device towards left or right indicates a coding strategy adjustment.

19. The method of claim 17, wherein tilting the mobile device towards left or right indicates a gain adjustment.

20. The method of claim 1, wherein the test signal is presented to a recipient of the auditory prosthesis.

* * * * *